United States Patent [19]
Newton

[11] Patent Number: 5,516,258
[45] Date of Patent: May 14, 1996

[54] DUCTED FAN GAS TURBINE ENGINE NACELLE ASSEMBLY

[75] Inventor: Arnold C. Newton, Derby, England

[73] Assignee: Rolls-Royce plc, Derby, England

[21] Appl. No.: 419,391

[22] Filed: Apr. 10, 1995

[30] Foreign Application Priority Data

Apr. 20, 1994 [GB] United Kingdom ............... 9407840

[51] Int. Cl.⁶ ................................................. F01D 21/00
[52] U.S. Cl. ................................ 415/9; 415/200
[58] Field of Search ............................. 415/9, 200

[56] References Cited

U.S. PATENT DOCUMENTS

| | | | |
|---|---|---|---|
| 2,857,093 | 10/1958 | Warnken | 415/200 |
| 3,974,313 | 8/1976 | James | |
| 4,149,824 | 4/1979 | Adamson | 415/9 |
| 4,411,589 | 10/1983 | Joubert et al. | |
| 4,534,698 | 8/1985 | Tomich et al. | |
| 4,902,201 | 2/1990 | Neubert | 415/9 |

FOREIGN PATENT DOCUMENTS

| | | |
|---|---|---|
| 0030179 | 6/1981 | European Pat. Off. |
| 1458873 | 10/1976 | United Kingdom |
| 2112349 | 7/1983 | United Kingdom |
| 2159886 | 12/1985 | United Kingdom |
| 2265418 | 9/1993 | United Kingdom |

*Primary Examiner*—Edward K. Look
*Assistant Examiner*—Christopher Verdier
*Attorney, Agent, or Firm*—Cushman Darby & Cushman

[57] ABSTRACT

A ducted fan gas turbine engine nacelle assembly comprises an aerodynamic nacelle within which is enclosed a ducted fan gas turbine engine. The nacelle includes an annular containment structure which surrounds the engine fan and fan casing to contain any detached fan blade or blade parts.

10 Claims, 1 Drawing Sheet

DUCTED FAN GAS TURBINE ENGINE NACELLE ASSEMBLY

FIELD OF THE INVENTION

This invention relates to a ducted fan gas turbine engine nacelle assembly which comprises a ducted fan gas turbine engine enclosed within an aerodynamic nacelle.

BACKGROUND OF THE INVENTION

Ducted fan gas turbine engines for aircraft propulsion normally comprise a core engine which drives a propulsive fan. The fan in turn comprises a number of radially extending aerofoil blades mounted on a common hub and enclosed within a generally cylindrical casing.

There is a remote possibility with such engines that part or all of one or more of the fan blades could become detached from the remainder of the fan. This might be as the result of, for instance, the engine ingesting a large foreign body, such as a bird. In the event of this happening, it is extremely important that the detached blade or blade portion is contained by the structure which surrounds it. Conventionally this means that the fan casing which surrounds the fan blades must be sufficiently strong to ensure that the detached blade or blade portion does not pass through the casing and cause damage to the aircraft carrying the engine.

There are various ways in which the problem of fan blade containment may be tackled. The most obvious way is to manufacture the fan casing from an alloy which is sufficiently strong and thick to provide the desired degree of containment. However this almost invariably results in a fan casing which is undesirably heavy. An alternative approach is to provide an aluminium alloy fan casing which is thin, and therefore light, and wind around it a strong fibrous material such as a fibrous aromatic polyamide. In the event of all or part of a fan blade becoming detached, the detached portion passes through the thin aluminium alloy casing but is contained by the fibrous material. Such a containment system is described in GB2159886B.

While the use of a fibrous containment material in this way is effective in providing fan blade containment, there are certain drawbacks to its use. Since the fibrous containment material is positioned close to the air which is compressed by the fan, it tends to heat up. Certain strong, lightweight fibrous containment materials which would otherwise be well suited to use in such an application cannot be so used in view of their poor tolerance to high temperatures in this sort of environment. Consequently high temperature tolerant, but unfortunately heavy, fibrous containment material must be used, thereby having a detrimental effect upon overall engine weight.

A further drawback is that in the event of a fan blade failure and subsequent successful containment, there can be rubbing between what remains of the fan and its surrounding casing. Such rubbing can result from rotation of the fan through continuing engine operation or through the air flow over the fan resulting from aircraft motion. This can lead in turn to undesirable overheating of the fan and casing. Additionally during containment, significant additional axial loads are placed upon the fan blades. Consequently strong, and usually undesirably heavy locking devices have to be applied to the blade roots to prevent further fan blades being lost.

A yet further drawback is that conventionally, the intake portion of the nacelle which encloses the engine is supported by the fan casing. If the fan casing is destroyed, such support is lost, thereby possibly causing loss of the nacelle intake portion.

SUMMARY OF THE INVENTION

It is an object of the present invention to provide a ducted fan gas turbine engine nacelle assembly in which such difficulties are generally avoided.

According to the present invention, a ducted fan gas turbine engine nacelle assembly comprises an aerodynamic nacelle enclosing a ducted fan gas turbine engine, said engine including a fan and an annular casing surrounding the radially outer extent of said fan to define a fan duct, said nacelle including an annular containment structure located radially outwardly of said fan and its surrounding casing in spaced apart relationship therewith, said containment structure comprising a plurality of layers of fibrous containment material.

BRIEF DESCRIPTION OF THE DRAWINGS

The present invention will now be described, by way of example, with reference to the accompanying drawings in which.

DETAILED DESCRIPTION OF THE INVENTION

Figure 1:
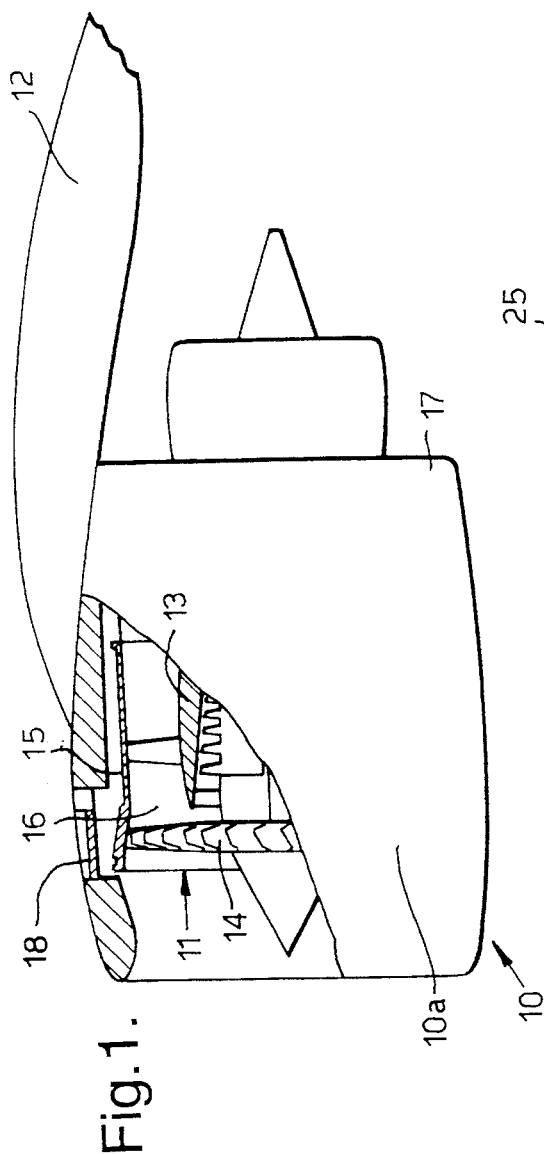
FIG. 1 is a partially sectioned side view of a nacelle assembly in accordance with the present invention comprising a nacelle having a ducted fan gas turbine engine positioned within it.

With reference to FIG. 1, a nacelle assembly generally indicated at 10 comprises a conventional ducted fan gas turbine engine enclosed within an aerodynamic nacelle 10a. The nacelle assembly 10 is supported from a pylon 12 which is in turn attached to the underside of an aircraft wing (not shown).

The gas turbine engine 11 includes a core engine 13 which drives a propulsive fan 14. The fan 14 is enclosed within an annular casing 15 which, together with the core engine 13 defines an annular fan duct 16. Air accelerated by the fan 14 is divided into two flows. The first flows into the core engine 13 to facilitate its operation. The second flows through the fan duct 16 to be exhausted from the downstream end 17 of the nacelle assembly 10 to provide propulsive thrust.

The fan casing 15 is formed from a rigid, lightweight material, such as carbon fibre reinforced epoxy resin. The material is only strong enough to ensure that the fan casing 15 fulfils its aerodynamic function of defining the fan duct 16. The fan casing 15 does not, therefore, play any significant role in the containment of whole fan blades or blade parts which may be released from the fan 14. The release of such fan blades or blade parts may occur as the result of the ingestion of a large foreign object, such as a large bird, by the engine 11. This is in direct contrast to conventional fan casings 15 which are usually very substantial structures in order to be capable of containing such released fan blades or blade parts.

Figure 2:
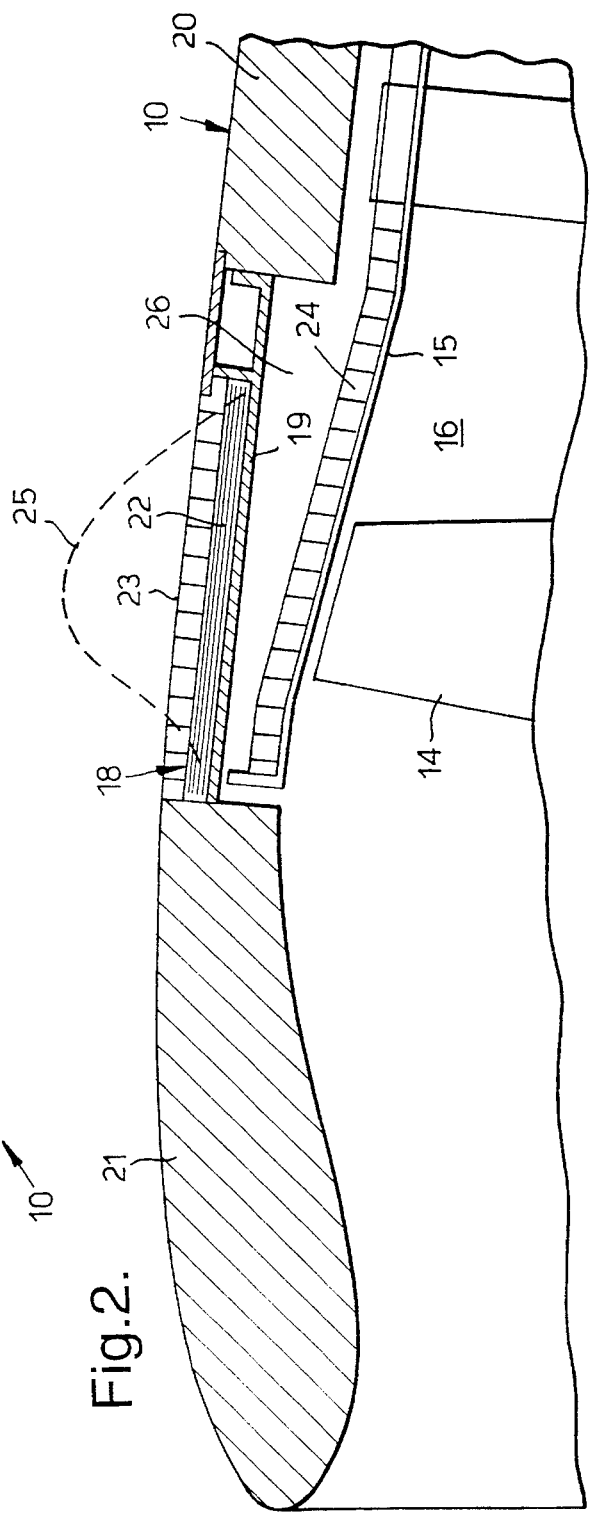
FIG. 2 is a view on an enlarged scale of a sectioned part of the nacelle assembly shown in FIG. 1.

In order to provide effective containment of released fan blades or blade parts, a containment structure 18 is contained within the nacelle 10a. The structure 18, which can be seen more easily if reference is made to FIG. 2, is annular and is coaxially located radially outwardly of that portion of the fan casing 15 which surrounds the fan 14. It comprises an annular metallic support member 19 which is axially interposed between the major portion 20 of the nacelle 10a and that portion 21 of the nacelle 10a which defines its intake. The support member 19 has a plurality of layers of fibrous containment material 22 wound around its radially outer surface. The material 22 may be of any type which is capable of containing a detached fan blade or fan blade portion from the fan 14. Thus, for instance, the material may be of the type known as "Kevlar" which is an aromatic polyamide supplied by Du Pont. The fibres of the containment material are not contained within a matrix material and are woven either as a continuous piece or alternative as a series of separate pieces which are stitched together by a comparatively low strength frangible fibrous material such as cotton. Such arrangements of fibrous containment material are more fully described in GB2159886B.

The radially outer surface of the fibrous containment material 22 is covered by an open honeycomb material 23 which provides a rigid lightweight support for the part of the outer skin of the nacelle 10a which is near to the fan 14. Thus, the air intake portion of the nacelle is supported solely by the remainder of the nacelle. Similar open honeycomb material 24 is provided on the radially outer surface of the fan casing 15 in order to confer even greater rigidity on the casing 15.

In the event that a fan blade or blade portion becomes detached from the fan, it travels in a radially outward direction to impinge the fan casing 15. However, since the fan casing 15 is a thin, although rigid, lightweight structure, the blade or blade portion passes straight through it with minimal retardation. Similarly, the detached fan blade or blade portion passes through the metallic support member 19. However as soon as the fan blade or blade portion engages the fibrous containment material 22, it is contained by that material 22. The kinetic energy of the blade or blade portion is absorbed by the containment material 22 as it deflects into the shape shown in interrupted lines 25. The detached fan blade or blade portion is therefore contained within the nacelle assembly 10, thereby ensuring that the danger of impact damage to the fuselage of the aircraft carrying the engine 11 is minimized.

When a fan blade failure has occurred, the circumferential extent of damage to the metallic support 19 is usually quite limited. This being so the member 19 continues to provide support for the intake portion 21 of the nacelle assembly 10, thereby preserving nacelle 10a integrity.

A further possible consequence of fan blade failure is that the fan 14, as a result of its imbalance, will tend to rotate about a new axis of rotation which is not coaxial with the main longitudinal axis of the core engine 13. This in turn leads to rubbing contact between the tips of the remaining fan blades of the fan 14 and the radially inner surface of the fan casing 15. Were the fan casing to be conventionally formed from a strong containment material, such as thick steel, this could produce significant overheating and thereby a fire risk. However since in the case of the present invention, the fan casing 15 is formed from a lightweight material which would be readily destroyed by the fan blade tips, the danger of such overheating is significantly reduced.

It will be seen that since the fibrous containment material 22 is not positioned on the radially outer surface of the fan casing 15 as is conventionally the case, it is not directly exposed to the thermal effects of the air which is accelerated by the fan 14 as it flows through the fan duct 16. The fibrous containment material 22 is located within the relatively cool nacelle assembly 10. As a consequence of this, the fibrous containment material 22 may be one which has desirable high strength characteristics at relatively cool temperatures but which loses those strength characteristics at higher temperatures. Indeed if it is desired to enhance this effect, steps may be taken to divert a portion of the ambient air flow over the exterior surface of the nacelle assembly 10 and direct it into the nacelle cavity 26 which contains the fibrous containment material 22 in order to provide enhanced cooling of that material.

Although the present invention has been described with reference to fibrous containment material 22 which has an essentially passive role until it is required to contain a detached fan blade or blade portion, it will be appreciated that this need not necessarily always be the case. Since the fibrous containment material 22 is located in a relatively cool part of the nacelle assembly, it could in fact be a structural part of that assembly if it was embedded in a matrix material such as a resin. This would in turn open up the possibility of reducing the overall weight of the nacelle assembly 10.

I claim:

1. A ducted fan gas turbine engine nacelle assembly comprising an aerodynamic nacelle enclosing a ducted fan gas turbine engine, said engine including a fan and an annular casing surrounding the radially outer extent of said fan to define a fan duct, said nacelle including an annular containment structure located radially outwardly of said fan and its surrounding annular casing and separated from said fan casing, said containment structure comprising a plurality of layers of fibrous containment material, said nacelle additionally including an air intake portion positioned upstream of said annular fan casing, said air intake portion being supported by the remainder of said nacelle and independently of said fan casing.

2. A ducted fan gas turbine engine nacelle assembly as claimed in claim 1 wherein said fibrous containment material is woven.

3. A ducted fan gas turbine engine nacelle assembly as claimed in claim 2 wherein said fibrous containment material comprises a plurality of woven pieces which are sewn together with a readily frangible material.

4. A ducted fan gas turbine engine nacelle assembly as claimed in claim 1 wherein said containment structure comprises a rigid annular support member defining a radially outer surface which supports said plurality of layers of containment material.

5. A ducted fan gas turbine engine nacelle assembly as claimed in claim 4 wherein said plurality of layers of containment material support an open cell honeycomb material on the radially outer surface of said containment material.

6. A ducted fan gas turbine engine nacelle assembly as claimed in claim 5 wherein said open cell honeycomb material supports a portion of the external skin of said aerodynamic nacelle.

7. A ducted fan gas turbine engine nacelle assembly as claimed in claim 4 wherein said rigid annular support member additionally supports the intake region of said nacelle from a main portion of said nacelle.

8. A ducted fan gas turbine engine nacelle assembly as claimed in claim 1 wherein said annular casing surrounding said fan is formed from a composite material.

9. A ducted fan gas turbine engine nacelle assembly as claimed in claim 8 wherein said annular casing defines a radially outer surface to which surface is bonded an open cell honeycomb support structure.

10. A ducted fan gas turbine engine nacelle assembly as claimed in claim 1 wherein said fibrous containment material is an aromatic polyamide.

* * * * *